US010116727B2

(12) United States Patent
Volchok

(10) Patent No.: US 10,116,727 B2
(45) Date of Patent: Oct. 30, 2018

(54) EMBEDDABLE WEB ANALYTICS TRACKING VIA MOCK ENVIRONMENT

(71) Applicant: Alex Volchok, Tel Aviv (IL)

(72) Inventor: Alex Volchok, Tel Aviv (IL)

(73) Assignee: SAP SE, Walldorf (DE)

( * ) Notice: Subject to any disclaimer, the term of this patent is extended or adjusted under 35 U.S.C. 154(b) by 346 days.

(21) Appl. No.: 14/572,501

(22) Filed: Dec. 16, 2014

(65) Prior Publication Data

US 2016/0173626 A1 Jun. 16, 2016

(51) Int. Cl.
*G06F 15/173* (2006.01)
*H04L 29/08* (2006.01)
*G06F 17/30* (2006.01)

(52) U.S. Cl.
CPC .......... *H04L 67/02* (2013.01); *G06F 17/3089* (2013.01)

(58) Field of Classification Search
CPC .. G06F 17/30; G06F 17/30241; G06F 21/604; G06F 9/4443; G06F 19/3431; G06F 19/3437; G06F 19/3443; H04L 67/02; H04L 67/06; H04L 67/22; H04L 67/025; H04L 41/0246; H04L 41/0266
See application file for complete search history.

(56) References Cited

U.S. PATENT DOCUMENTS

| | | | | |
|---|---|---|---|---|
| 6,952,723 B1 * | 10/2005 | Laiho | ................ | G06F 17/30887 707/E17.115 |
| 8,214,691 B1 * | 7/2012 | Spalink | ................... | H04L 43/50 714/28 |
| 8,543,715 B1 * | 9/2013 | Rabbat | .............. | G06F 17/30864 709/219 |
| 2002/0152241 A1 * | 10/2002 | Hepworth | .............. | G06K 19/06 715/236 |
| 2007/0168657 A1 * | 7/2007 | Carro | .................... | G06F 21/645 713/156 |
| 2008/0046562 A1 * | 2/2008 | Butler | ................. | G06F 17/3089 709/224 |
| 2008/0184116 A1 * | 7/2008 | Error | ................... | G06F 11/3612 715/704 |

(Continued)

OTHER PUBLICATIONS

"Traditional Syntax," Google Analytics, *Google Developers*, visited Sep. 22, 2014, 4 pages.

(Continued)

*Primary Examiner* — Tauqir Hussain
*Assistant Examiner* — Thao D Duong
(74) *Attorney, Agent, or Firm* — Klarquist Sparkman, LLP

(57) ABSTRACT

Analytics can be performed via analytics snippets that are ordinarily used for remote web page navigation, even though the content does not come from a remote server. The snippet can be embedded into a web application that simulates visitation to a simulated web page address by staging a mock environment that reflects properties for the web page, such as the simulated web page address or other arbitrary information. The analytics snippet is then executed in the mock environment. So, the snippet extracts information from the mock environment and reports it to the analytics server. Subsequently, when analytics reports are presented, the simulated web page address is reflected. The true address of the web page can be preserved and presented in the report to conveniently link back to the page in the local environment.

20 Claims, 10 Drawing Sheets

(56) References Cited

U.S. PATENT DOCUMENTS

| | | | | |
|---|---|---|---|---|
| 2012/0116868 A1* | 5/2012 | Chin | .................. | G06Q 30/0203 |
| | | | | 705/14.43 |
| 2013/0205198 A1* | 8/2013 | Cohen | ................ | G06F 17/2247 |
| | | | | 715/240 |
| 2014/0223005 A1* | 8/2014 | Everly | .................... | H04L 67/22 |
| | | | | 709/224 |
| 2014/0304816 A1* | 10/2014 | Klein | ..................... | G06F 21/56 |
| | | | | 726/23 |

OTHER PUBLICATIONS

West, "Play safely in sandboxed IFrames," http://www.html5rocks.com/en/tutorials/security/sandboxed-iframes/, visited Sep. 24, 2014, 11 pages.

Nadel, "Using an IFrame to Override document.write( ) Inside a Dom (Document Object Model) Sandbox," http://www.bennadel.com/blog/2316-using-an-iframe-to-override-document-write-inside-a-dom-document-object-model-sandbox.htm, visited Sep. 24, 2014, 8 pages.

"Sandbox," Internet Explorer Dev Center, http://msdn.microsoft.com/en-us/library/ie/hh673561(v=vs.85).aspx, visited Sep. 24, 2014, 2 pages.

"Wix Features: Everything you need to create & manage your entire online presence," wix.com, visited Oct. 8, 2014, 36 pages.

"Google Analytics," Tutorial, http://www.wix.com/support/html5/search-engine-optimization/site-statistics-google-analytics/tutorial/google-analytics, visited Oct. 9, 2014, 3 pages.

"Creating a Google Analytics Account," Tutorial, http://www.wix.com/support/html5/search-engine-optimization/site-statistics-google-analytics/tutorial/creating-a-google-analytics-account, visited Oct. 9, 2014, 4 pages.

"Adding Your Google Analytics Code to Your Wix Site," Tutorial, http://www.wix.com/support/html5/search-engine-optimization/site-statistics-google-analytics/tutorial/adding-your-google-analytics-code-to-your-wix-site, visited Oct. 9, 2014, 2 pages.

"Google Analytics Frequently Asked Questions," Tutorial, http://www.wix.com/support/html5/search-engine-optimization/site-statistics-google-analytics/tutorial/google-analytics-frequently-asked-questions, visited Oct. 9, 2014, 3 pages.

"Web application," *Wikipedia*, visited Oct. 15, 2014, 8 pages.

"How to reference content (HTML)," *Microsoft Dev Center—Windows*, msdn.microsoft.com, visited Oct. 15, 2014, 2 pages.

"Loading and executing the traditional (synchronous) Google Analytics tracking code snippet as the first DOM element," stackoverflow.com, visited Oct. 15, 2014, 2 pages.

\* cited by examiner

EMBEDDABLE WEB ANALYTICS TRACKING VIA MOCK ENVIRONMENT

BACKGROUND

Web analytics tracking has become widespread in the computing world and many third parties provide analytics tracking software for use in web pages. This tracking software may be executed each time a web page is loaded by a client browser from a remote server. For example, an analytics snippet can be provided for placement in web pages of a web site. However, there are some circumstances under which such snippets do not work well.

There is therefore room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

An embodiment can be implemented as a method implemented at least in part by a computer, the method comprising receiving an indication of navigation to a web page; staging a mock environment reflecting visitation to the web page; and executing an analytics snippet in the mock environment, wherein executing the analytics snippet reports visitation to the web page based on the mock environment.

An embodiment can be implemented as a system comprising one or more computer-readable media comprising an analytics snippet; a mock environment into which the analytics snippet is embedded and from which the analytics snippet is operable to extract one or more properties; and a web page navigation listener, wherein the web page navigation listener is configured to receive an indication of navigation to a web page, coupled to the mock environment and configured to alter the mock environment to reflect visitation to a simulated web page address for the web page, and configured to execute the analytics snippet in the mock environment after altering the mock environment to reflect visitation to the simulated web page address for the web page; whereby the system simulates, via the analytics snippet and the mock environment, visitation to the simulated web page address for the web page.

An embodiment can be implemented as one or more computer-readable media comprising computer-executable instructions that when executed cause a computing system to perform a method comprising receiving an indication of navigation to a locally-hosted web page; responsive to receiving the indication of navigation, staging a mock environment reflecting visitation to the web page, wherein staging the mock environment comprises setting a property of the mock environment to indicate a simulated web page address and encoding a local link to the web page into an encoded local link; and executing an analytics snippet in the mock environment, wherein the analytics snippet is placed in an execution context where information from the mock environment is available for extraction by the analytics snippet and executing the analytics snippet reports visitation to the simulated web page address and provides the encoded local link to an analytics server for retrieval in a subsequent analytics report involving the web page.

As described herein, a variety of other features and advantages can be incorporated into the technologies as desired.

DETAILED DESCRIPTION

Example 1—Example Overview

Tracking web page data is made complicated by the growing use of web applications that do not require accessing a server to obtain a requested web page. The technologies described herein can be used to track analytics data of web pages hosted by a client-side web application. Integration of standard third-party analytics software snippets can be greatly simplified by providing a standard environment within which the snippet may execute. The analytics snippet can be used as-is, and it can execute as if it were contained in a web page from a remote web server, providing web page properties to an analytics tracking system.

User integration into a web application can be accomplished without detailed knowledge of the third party software. Server-side APIs can be avoided. Accordingly, seamless integration into content creation tools can be achieved. The user need only supply the analytics snippet to the content creation tool, and the tool can create an application that tracks locally-hosted pages in the application.

The technologies can be helpful in tracking web page analytics even when the web application does not request a new web page from a server. Web pages that do not have traditional URIs can be tracked and categorized with user-selectable page properties. Information about the location of the web page within the internal structure of the web application can also be provided to an analytics tracking system, enabling a user reviewing analytics to link-back to the page about which the statistics are being tracked.

Although web portals are used as an example of a web application, the technologies can be equally applied to other scenarios where web site content is delivered without visiting a server to retrieve web pages via a traditional web page address.

Example 2—Example System Implementing Analytics Tracking Via a Mock Environment

Figure 1:
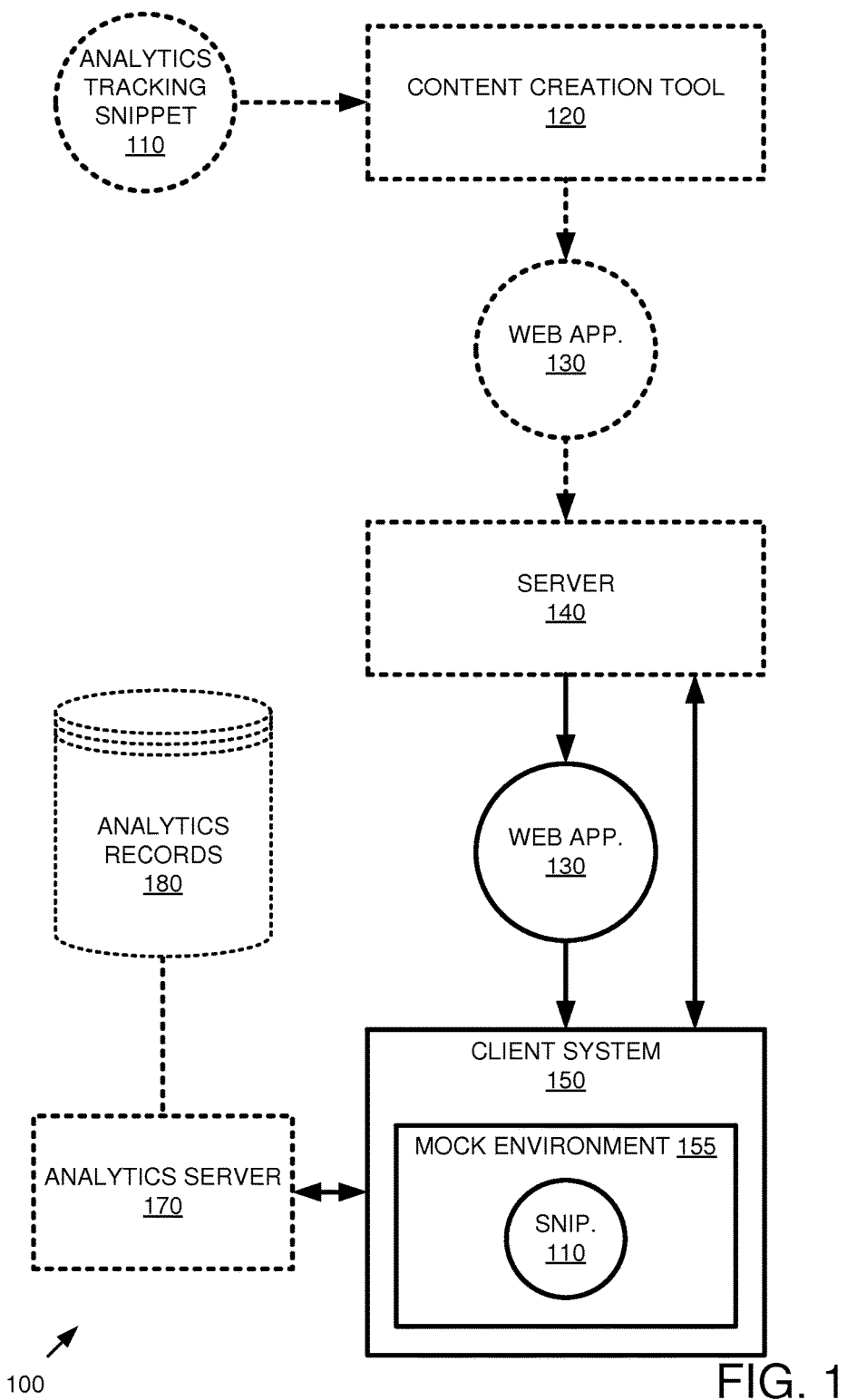
FIG. 1 is a block diagram of an example system for implementing embedded web analytics tracking via a mock environment.

FIG. 1 is a block diagram of an example system 100 implementing embedded web analytics tracking via a mock environment as described herein.

In the example, an analytics tracking snippet 110 is used as input to a content creation tool 120 to create a web application 130 with the capability of tracking analytics data for web pages generated within the web application 130. As described herein, the web application 130 can store structure and content of a web site or web portal.

The content creation tool 120 (e.g., web application framework) is configured to incorporate the analytics snippet 110 into the web application 130. The web application 130 can be published to a web server 140, making the web application 130 available to remote computers over a network.

A client system 150 can request the web application 130 from the server 140 using a web browser or other suitable client-side application on a client system 150. Although only one server 140 and one client 150 are shown, in practice, any number of servers and clients can be connected through the network.

After the web application 130 is transmitted to the client system 150, the web application 130 can be executed (e.g., within a browser). Execution of the web application code displays a web application user interface (UI) on the client system 150. A user of the client system 150 interacts with the web application 130 using a suitable input device, such as a mouse, touch device, or the like, to activate links to web pages within the web application 130.

When an indication of navigation to a web page is detected, the web application 130 stages a mock environment 155, as described herein, and executes the analytics snippet 110 in the mock environment 155. The snippet 110 then transmits information about the requested web page to an analytics server 170, through a suitable network connection. For example, the mock environment 155 can be modified to contain a simulated web page address, which is then reported by the snippet 110 to the server 170 as the page that was visited.

The analytics server 170 can be operated by a third party provider such as an analytics service provider and compiles the information sent by the analytics snippet 110, storing it for later use in analytics records 180. When requested by a user, the analytics server 170 can create an analytics report from the analytics records 180 and send it to the user as described herein.

In any of the examples herein, although some of the subsystems are shown as a single device, in practice, they can be implemented as computing systems having more than one device. Boundaries between the components can be varied. For example, although the analytics server 170 is shown as a separate device, it may be part of the server 140.

In practice, the systems shown herein, such as system 100, can vary in complexity, with additional functionality, more complex components, and the like. For example, additional components can be included to implement security, redundancy, load balancing, report design, single sign on, and the like.

In practice, a large number of different web applications 130 and analytics tracking snippets 110 (e.g., executing at plural instances of a client system 150) can be supported.

The described computing system can be networked via wired or wireless Internet connections. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the inputs, outputs, requests, web pages, snippets, databases, and environments can be stored in one or more computer-readable storage media or computer-readable storage devices. The technologies described herein can be generic to the specifics of operating systems or hardware and can be applied in any variety of environments to take advantage of the described features.

Example 3—Example Method Implementing Web Analytics Tracking

Figure 2:
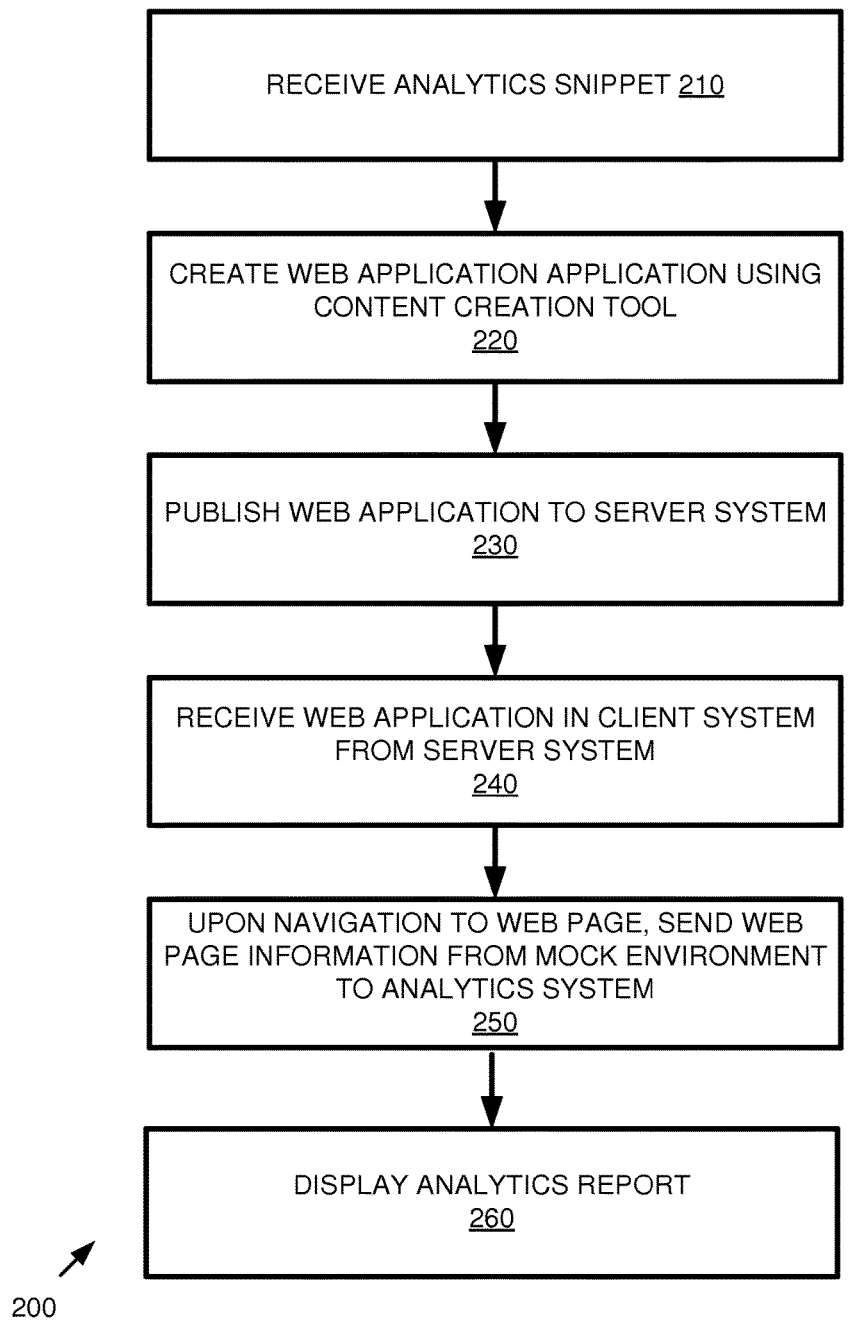
FIG. 2 is a flowchart of an example method of implementing embedded web analytics tracking via a mock environment.

FIG. 2 is a flowchart of an example method 200 of embedded web analytics tracking via a mock environment and can be implemented, for example, in the system shown in FIG. 1. The example includes creating a web application, receiving the application at the client, monitoring navigation within the web application, and ultimately providing an analytics report. Various parts of the overall method are described in more detail separately herein and can be performed separately.

At 210, an analytics tracking snippet is received as described herein. For example, receipt of the analytics tracking snippet can be accomplished by obtaining it from an analytics service provider.

At 220, a web application incorporating the analytics tracking snippet is created using a content creation tool as described herein.

At 230, the web application incorporating the analytics tracking snippet is published to a server system, making it available to requesting clients.

At 240, a client system receives the web application in response to a request from the server system. Requests for the web application can be made from a web browser or other application capable of orchestrating execution of the web application.

The web application can then be executed, which results in presentation of content in the form of web pages.

At 250, responsive to detection of a navigation event (e.g., to a locally-hosted page), information about the web page being visited is sent from a mock environment to the analytics system. The analytics tracking snippet can be executed in a staged mock environment to achieve such an arrangement. Such information can include a simulated web page address and other information as described herein.

At 260, after information is collected over time, a web analytics report generated by the analytics system is displayed. The analytics system can receive information about page navigations from a plurality of clients running the web application. As described herein, link-back functionality can be provided whereby a link to a local web page is shown by which navigation to a page listed in the report can be achieved.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, for 250 "send web page information to an analytics system" can also be described as "receive web page information from a client."

Example 4—Example Implementation on Client Side

Figure 3:
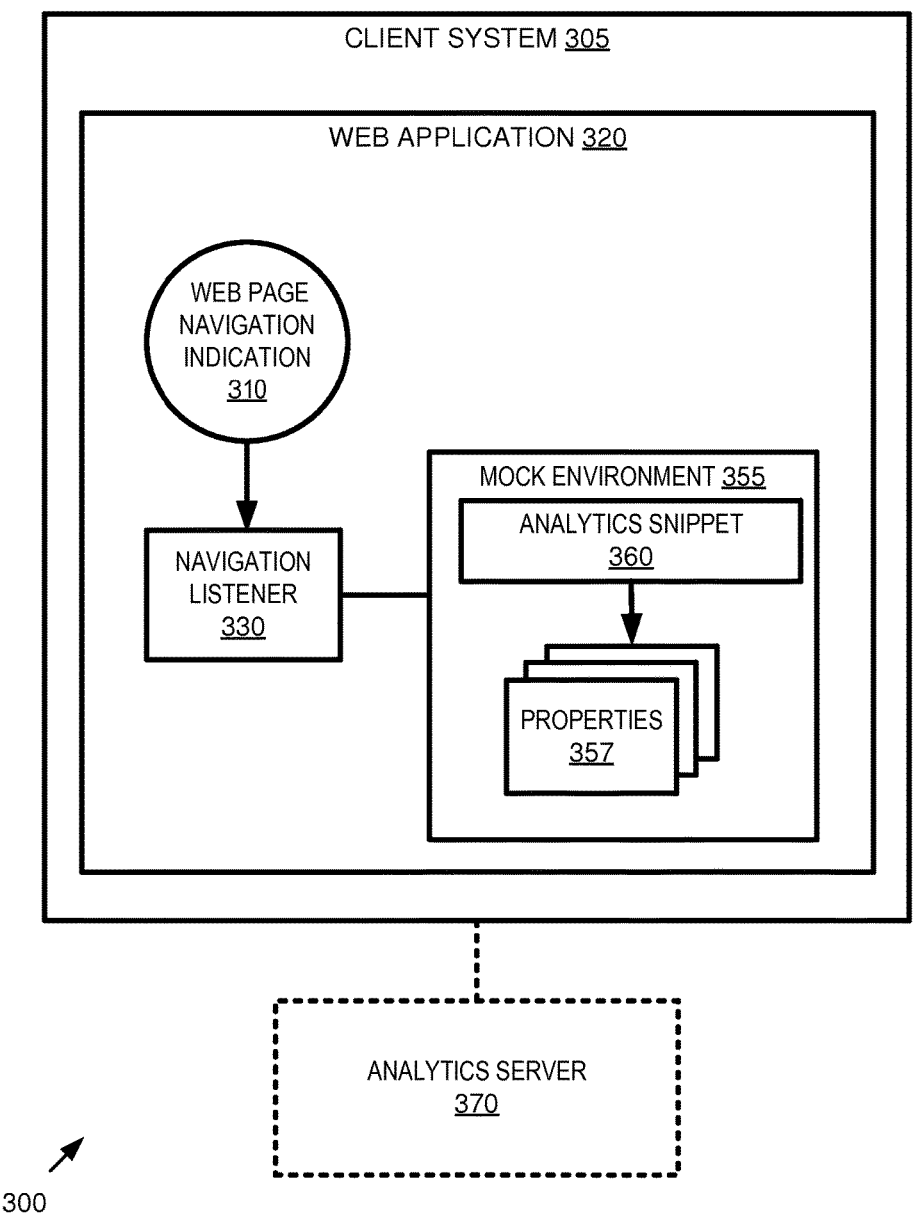
FIG. 3 is a block diagram of an example system implementing embeddable analytics tracking via a mock environment from a client perspective.

FIG. 3 is a block diagram of an example system 300 implementing embeddable web analytics tracking via a mock environment from the perspective of a client 305. In the example, the client system 305 hosts a web application 320 that includes a navigation listener 330 and a mock environment 355 (e.g., having one or more properties 357) and is in communication with an analytics server 370 (e.g., to which the properties 357 can be sent). As shown, the web application 320 can host an analytics snippet 360 embedded into the mock environment 355 that reports the properties 357 to the analytics server 370 as a visitation to a page with a simulated web page address, even if the page presented was not provided by visitation to the indicated address.

The client system 305 can include a browser that executes the web application 320 to present a user interface in the form of web pages with one or more links. The navigation listener 330 can be configured to receive an indication 310 of navigation to a web page associated with a local address.

The mock environment 355 can be staged by the web application 320 and host execution of the embedded analytics snippet 360. The properties 357 can be set to indicate a simulated web page address (e.g., based on the true web page address). When executed, the snippet 360 is operable to extract the properties 357 and send them to analytics server 370, including the simulated web page address. The snippet 360 can thus send a report to the server 370 of the visitation to the web page according to the properties 357 in the mock environment 355. Such reports are then aggregated and used to generate analytics reports.

The mock environment 355 can simulate a context within the web application 320. For example, the properties associated with the mock environment 355 may be overwritten with or simulate the properties of a navigated-to page. Such properties can include a simulated web page address, title of the page, or the like. In this way, when the analytics snippet 360 executes within the mock environment 355, the properties of the requested web page (e.g., including the simulated web page address) are sent to analytics server 370 by the snippet 360, which uses the information to track visitation traffic.

The pages within the web application 320 can be locally-hosted as described herein. As described herein, the location of the web page in the web application 320 (e.g., URI) can be encoded and included as a property 357 that is communicated to the analytics server 370 for link back purposes as described herein. Thus, the analytics snippet 360 can relay an encoded local link to the web page to the analytics server 370. Subsequently, on an analytics report for the web page, a link for activation that comprises the encoded local link can be presented.

Example 5—Example Method from Client Perspective

Figure 4:
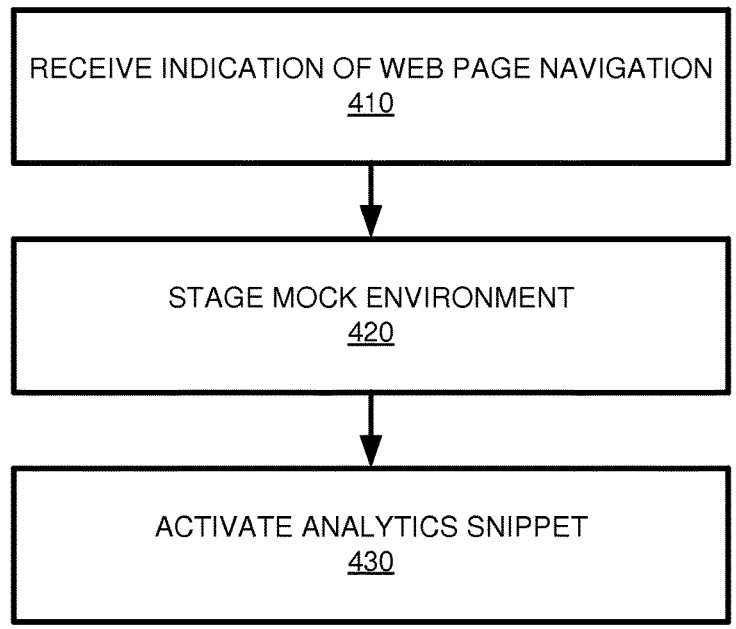
FIG. 4 is a flowchart of an example method implementing embeddable web analytics tracking via a mock environment from a client perspective.

FIG. 4 is a flowchart of an example method 400 of implementing embeddable web analytics tracking via a mock environment from a client perspective and can be implemented, for example, in the systems shown in FIG. 1 or 3. As described herein, a web application providing locally-hosted pages can implement the method.

At 410, an indication of a web page navigation to a web page is received as described herein. For example, a navigation event listener can be alerted when a web page is visited.

At 420, in response to an indication of page navigation, a mock environment is staged to reflect visitation to the web page. For example, one or more context properties of the mock environment can be set as described herein to reflect one or more properties for the web page that is visited (e.g., simulated web page address, page name, and the like). Any properties analyzed or reported by the analytics snippet can be staged. Thus, although visitation to the web page is reflected, the apparent circumstances under which the web page was visited can be altered to be different from what actually took place.

At 430, the analytics snippet is activated (e.g., executed) in the mock environment. The analytics snippet can then retrieve properties of the execution environment (e.g., as it would if the snippet had been embedded in a web page from a server) and send such information to an analytics server as described herein. Executing the analytics snippet thus reports visitation to the web page based on the mock environment (e.g., the one or more properties for the web page). For example, a visitation to the simulated web page address for the web page can be reported.

As described herein, actual visitation to a stub web page from an external server (e.g., at a simulated web page address) can be performed, but can be avoided.

As described herein, link back information can be included in the information sent to the analytics system to accomplish link back to the local page from a subsequent analytics report (e.g., a report involving the web page).

Subsequently, analytics reports can be generated based on the information sent by the snippet and other such snippets executing at multiple different instances of the web application.

Example 6—Example Externally-Hosted Web Pages

In any of the examples herein, an externally-hosted web page can be a web page that is hosted on a web server for request (e.g., via URI that indicates an external location). In such an arrangement, the structure of the website is stored at an external server and navigation within the website is handled by the server in that a server system serves pages that have links in the form of URIs that refer to further pages available upon request from the server system. When the server receives a request (e.g., via URI), it then generates a further web page that can have yet further links (e.g., URIs) to other pages.

In an externally-hosted web page scenario, an analytics snippet can be embedded in the pages held by the server to implement tracking according to any number of web analytics service providers. The analytics snippet may expect an indication that the page was successfully retrieved.

Example 7—Example Locally-Hosted Web Pages

In any of the examples herein, the technologies can support analytics tracking for locally-hosted web pages. A locally-hosted web page can include those pages that are stored locally or those generated locally (e.g., by a web application). In such a case, the URI of a locally-hosted web page points to a local location (e.g., at the client system), and the client application holds the structure of the website and can respond to a request for the local location with an appropriate web page or other HTML. Such pages can have a local web address and can be provided locally.

A typical implementation of such technologies is embodied in a web application that handles navigation from a web page in that the web application serves pages that have links in the form of URIs that refer to further pages available upon request from the web application. The web application can interpret a local web address to generate appropriate content. When the web application receives a request (e.g., via URI), it then generates a further web page that can have yet further links (e.g., URIs) to other pages.

In practice, the web application can request content or other information from a server to assemble the locally-hosted page, even if the server does not provide the actual web page.

Locally-hosted web pages are contrasted herein to externally-hosted web pages. Such locally-hosted web pages can be provided without relying on an external server to provide the actual web page (e.g., a stub page or no page is provided by the server) and may be generated internally by a web application. For example, a web application can preload content with AJAX, maintain web pages in memory on the client and enable programmatic navigation without affecting a URI. Accordingly, a typical web analytics snippet cannot function properly for locally-hosted web pages because web applications need not change their URI for external navigation.

As described herein, a visit to an externally-hosted web page can be simulated via use of an analytics snippet in a staged environment when, in reality, a locally-hosted web page is visited. Thus, the analytics features available for externally-hosted web pages can be provided to locally-hosted web pages.

Example 8—Example URI

In any of the examples herein, a uniform resource identifier (URI) can take the form of a string of characters that identify a resource such as a web page. Such URIs can be implemented as uniform resource locators (URLs) that specify a web address (e.g., of a web page).

In practice, a URI can include parameters for consumption by a web server or web application (e.g., appended at the end of domain name or IP address). In practice, such parameters can be removed during analytics processing. However, as described herein, parameters can be preserved as part of link back functionality.

The pages that are hosted locally need not have a URI context that is navigable or valid outside the application. For example, the URI may provide a URI with internal codes or parameters, the URI may provide a location of the page relative to other (e.g., local) pages, or the URI may provide a description of the page instead of a location.

Example 9—Example Simulated Web Page Address

In any of the examples herein, a simulated web page address, e.g. an arbitrary web page address pointing to a user-specified location on a host server, can be placed into the context of the mock execution environment. The analytics snippet will then report the simulated web page address to the analytics server. As described herein, such an address can take the form of a URI. In practice, the simulated web page address for the web page can indicate an external server even though the web page is provided by a local web application. Thus, it can be in the form of an address that points or appears to point to an external server as expected by an analytics snippet.

The simulated web page address can be based on the true (e.g., local or locally-hosted) web page address (e.g., used by a web application) or other property of the web page. For example, there can be a mapping between the true web page addresses and simulated web page addresses. The simulated web page address can use standard syntax to specify a simulated location. As described herein, a content creation tool can generate the application that presents the web pages as a web site or web portal. In such a case, the content creation tool can allow the author to specify names to be used as part of the simulated web page addresses (e.g., as part of the properties of an authored web page).

A hierarchy of names can be provided so that pages are grouped into categories, sub-categories, etc. For example, the web application can provide locally-generated pages that are logically grouped into categories, but are actually generated when requested in a different (e.g., flat) structure. The content creation tool can allow the author to inject arbitrary page hierarchies for page views into the application. In this way, the analytics reports can indicate visits to groups of the pages (e.g., the pages within a category) as if they were in a hierarchical arrangement on a server, even though they may not be so stored. Such reports can be useful to get a clear picture of which categories of the website are most popular.

In some cases, a visit to the simulated web page address can be performed (e.g., to visit a stub page), even though the actual content rendered is not derived therefrom. A server can be configured to simply always provide an "OK" response for such requests, provide a stub page, or both.

Example 10—Example Web Application

In any of the examples herein, a web application can be a software application that runs in a web browser and relies on a web browser to render the application. Such applications can be of a browser-supported programming languages and coding conventions, such as Java, JavaScript, HTML, XML, Flash, Silverlight, CSS, or other suitable technology. Web applications can be generated to be self-contained web sites or portals that are downloaded from a server and then executed locally to present content in a browser.

The web application can include local content and logic by which web pages can be generated or hosted locally as described herein. The structure of the web site generated by the web application, various user interface designs, and the like can thus be integrated into the application instead of being stored at a remote server. Still, the web application can interact with a server over a network to request content. For example, a content server can provide content maintained in a database or the like.

In practice, the web application can take the form of a simple website with only a few pages or a full featured web portal with many layers of organization. As described herein, the analytics tracking technologies can support complex web portals to better assist in managing such sites.

Web applications can be presentation-oriented (e.g., they generate dynamic web pages containing various types of markup language), service-oriented (e.g., they implement the endpoint of a fine-grained web service), or combinations thereof.

A client system with a suitable browser can execute the web application, which presents a user with content in the form of pages. The pages can contain links to other pages. Activating the page link causes the web application to generate a new page fulfilling the user request. However, a full page refresh may not be performed. The web application may use other inputs from the user to generate the page, such as inputs from forms, thereby generating dynamic pages.

As described herein, a web application can be created to contain the analytics snippet (e.g., the snippet can be embedded in the web application), and the snippet is then executed in a mock environment to simulate visitation to an external web server providing a web page, even though the web application generated the page.

Example 11—Example Web Analytics Snippet

In any of the examples herein, a web analytics tracking snippet (or "analytics snippet") can be a code sequence that works in conjunction with a web analytics server to provide web analytics services. In practice, such a snippet can be a short code sequence obtained from a third-party web analytics tracking service provider that is generally intended to be copied directly into a web page (e.g., as part of page tagging). The code can be in JavaScript or any suitable programming language that can be executed by a web browser. The snippet reports visits to pages to the analytics server.

Such web page analytics can track the number of visits to a page (e.g., counting visits), the order in which pages are navigated, who is visiting the pages (e.g., by geographical region or the like), and other web traffic information of interest to the administrator of the web pages.

A third party supplier can provide open source or free software (e.g., Open Web Analytics), proprietary software (e.g., Mint by Shaun Inman), hosted or software as a service (e.g., Google Analytics) or others. The analytics snippet can include an identifier or other mechanism to identify a specific account with which the analytics data is to be associated (e.g., the party for whom the analytics services are being provided).

In practice, the analytics snippet is placed somewhere in a web page (e.g., in anticipation of navigation to the page) and executes when the web page is loaded. It is thus placed in an execution context where information from the mock environment is available for extraction by the analytics snippet. It then accomplishes tracking of a web page visit by sending web page properties of visited pages to the analytics server. However, in the examples herein, the snippet need not actually be placed in the page beforehand. Instead, it can be provided to a web application that injects the snippet into code executed when a page navigation takes place.

In the examples herein, a snippet can be executed in a mock environment, leading to the conclusion that an indicated web page (e.g., at a simulated web page address) has been visited. However, the properties of the mock environment can be set to values that are technically incorrect (e.g., a visit to a page under the indicated conditions has not occurred) but helpful (e.g., a visit to a page under the simulated conditions can be tracked by the analytics provider for useful analytics reports).

Example 12—Example Mock Environment

In any of the examples herein, a mock environment can be created in which an analytics snippet can be executed. The mock environment can mimic an environment that would exist if a visitation to a simulated web page address (e.g., a web page address pointing to an external web server) had taken place, when in fact the web page that is actually rendered was something else (e.g., from a page address of a locally-hosted page). An analytics snippet executing in the mock environment relies on the context of (e.g., properties in) the mock environment and therefore operates under the assumption that a visitation to the simulated web page address for the web page actually happened. A variety of properties can be set depending on what the analytics snippet expects and what it reports back to the analytics server.

As described herein, the snippet can send context information from the mock environment (e.g., properties) to a web analytics server, which processes such properties to ultimately generate a web analytics report that can count web site traffic and perform other analytics functions.

Staging the mock environment can thus include setting properties (e.g., staged properties) of the environment so that the analytics snippet draws on the staged properties when reporting to the analytics server. Thus, by setting the properties to desired values, it appears to the analytics server that a visit to an indicated page has taken place, when in fact, a different page was visited.

Such a mock environment can be maintained as a mock environment between visits rather than creating a new one upon each visit. Properties can be cleared or overwritten to avoid data remaining from prior visits. Although shown as separate in some examples, the mock environment can be part of the web page that is generated.

As part of staging the mock environment, a visit to an actual page having the simulated page name may be performed. For example, a stub page with the simulated web page address (e.g., at an external server) can be visited, thereby fulfilling expectations by the snippet that an actual page view took place. However, the page need not be rendered for display so that the visit is transparent to the user. The mock environment itself can also be transparent to the user.

In other cases, it may be sufficient to set a property in the mock environment to indicate that the page view took place (e.g., an "OK" result), or the analytics snippet may assume that the page view took place by virtue of the fact that it was executed.

To achieve execution of the analytics snippet, its code can be injected for execution or otherwise embedded in the run time after a navigation occurs.

The mock environment can isolate the analytics snippet from the rest of the system, such that the activity of the snippet and reported content to the server can be controlled. The mock environment can be implemented as a sandbox that isolates the analytics snippet. For example, the sandbox can prevent code executing within it from performing unauthorized operations or otherwise interfering with the client or the web application that stages the mock environment. Such a sandbox can prevent execution of scripts, submission of forms, navigation, and same-origin policies. A subset of such features may be allowed to enable certain functionality, while still maintaining a division between the sandbox and the remainder of the system. For example, navigation and script features can be allowed so an analytics snippet can execute and send properties to an analytics server.

The mock environment can be staged in the same domain or context as the web page or web application to allow access to web page context (e.g., properties). So, it can be staged within a sandbox that shares context with a web application presenting the web page. As described herein, the mock environment can be implemented within a Document Object Model (DOM) of a web page. For example, a mock environment can be staged to reside within an IFrame as described herein.

The mock environment can support an arbitrary analytics snippet from any of a plurality of analytics service providers.

Example 13—Example Context Properties

The context properties (or simply "properties") of the mock environment can be set as described herein to achieve web analytics via the mock environment. Such properties can be drawn from properties of the web page (e.g., as stored by the web application).

Any number of properties, such as true web page address (e.g., URI), an encoded true (e.g., local) web page address, simulated web page address (e.g., URI), page title, page description, referring page, browser type and version, client IP address, and others can be supported.

Some properties can be staged, while others are authentic. For example, properties can be set within the mock environment or inherited from the actual environment in which the web page lives. A category of the web page can also be property as described herein. The URI of the true web page address (e.g., locally-hosted) can be encoded as described herein for link-back purposes.

The URI of the web page addresses described herein can have the same context as an external server (e.g., that provides stub pages) to prevent cross-domain problems.

Example 14—Example Indication of Web Page Navigation

In any of the examples herein, indication of web page navigation can take the form of an event triggered by receiving activation of a link to a desired web page or other activity that results in page navigation. As described herein, an event listener (e.g., navigation listener) can subscribe to events related to page navigation and be invoked upon occurrence of the link activation. Properties can be passed to the listener (e.g., via a programming object) that can be used to stage the mock environment as described herein. For example, a pointer to a context can be provided to the listener. Thus, receiving the indication can comprise receiving an event indicating one or more properties of the web page.

Navigation can include both the first page displayed (e.g., a home page when the web application is executed), those subsequent pages chosen by a user (e.g., via activation of links, typing URIs in manually, etc.), or other navigations (e.g., redirects or the like).

The indication may also be received for other reasons. For example, the web application may perform a calculation, the result of which requires navigation to a different page. In examples involving a web application, an event internal to the web application can cause the page navigation.

A listener can subscribe to an event such as "onloadQ" to accomplish navigation listening. The listener can then stage the mock environment and execute the analytics snippet when the mock environment finishes loading. The listener can also actually visit a mock page at an external server as described herein.

Example 15—Example Simulated Visitation

In any of the examples herein, simulating visitation to an external web page (e.g., at a simulated web page address) can be accomplished by visiting a mock page (e.g., visiting an external stub page with little or no content). However, the technologies can also function without visiting an external web server for the web page.

Such visitation can be performed transparently to the user. For example, in a sandbox implementation, only the sandbox will actually navigate to the location.

Example 16—Example Analytic Reports

The analytics system can assemble a report reflecting total page navigations in specific categories, such as number of page views, time viewing page, page location, and any other user configurable page information. The user may request certain information from the analytics system to be included in the report. The analytics report contains information about the client-generated pages as if the analytics snippet were embedded into each page on a web server.

Via the technologies described herein, such reports can reflect locally-hosted web page navigation and traffic as if external server visitations took place.

A third party service provider can provide for a plurality of customers. The snippet can indicate a customer identifier in such a situation.

Example 17—Example System for Creating the Web Application

Figure 5:
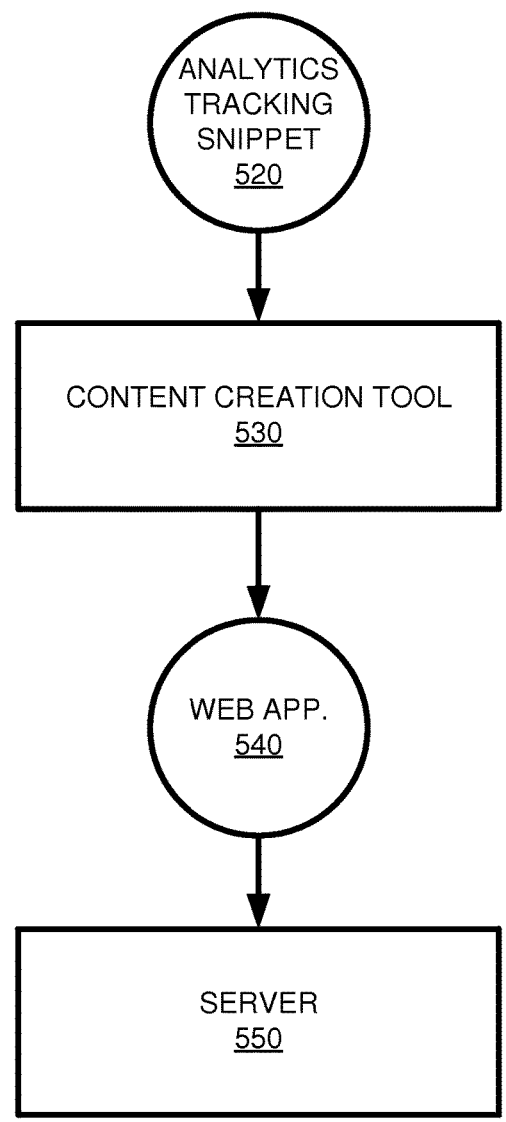
FIG. 5 is a block diagram of an example system for building a web application that implements embeddable web analytics tracking via a mock environment.

FIG. 5 is a block diagram of an example system 500 to create a web application 540 that implements embeddable web analytics via a mock environment. The system comprises a generic analytics snippet 520 (e.g., from a third party analytics provider) for embedding in a web application 540 via a content creation tool 530. The web application 540 can be published to a web server 550.

The content creation tool can be provided via the cloud (e.g., as a service by which users can create web applications). Although the example shows using a content creation tool 530, the web application 540 can also be created in any number of other ways, including writing the code manually or using a web application development service or environment.

After the content creation tool 530 receives the analytics snippet 520, it can incorporate the snippet 520 into code of the web application 540. The content creation tool 530 need not alter the analytics snippet 520. Instead, the content creation tool 530 arranges for placement of the analytics snippet 520 in a mock environment when the web application 540 is executed.

In the example, the content creation tool 530 has a user interface that allows a user to specify visual and functional aspects of the web application 540. For example, the user may wish to have dynamic web pages that are generated within the web application 540.

The content creation tool 530 provides the code to generate the web pages. The web pages may have forms, inputs, outputs, access databases, or other such functionality, controlled by the web application 540. The content creation tool 530 provides a convenient mechanism for creating the web application 540.

Via application of the technologies herein, the web application 540 can also support web analytics tracking via standard web analytics snippets, thereby providing a convenient way to generate a web application 540 that supports analytics on traffic for the web application 540.

Example 18—Example Method of Creating the Web Application

Figure 6:
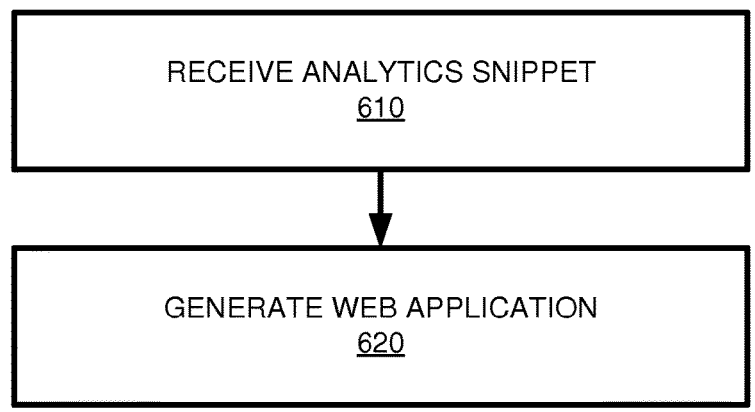
FIG. 6 is a flowchart of an example method of creating a web application that implements embeddable web analytics tracking via a mock environment.

FIG. 6 is a flowchart of an example method 600 of creating a web application that implements embeddable web analytics tracking via a mock environment and can be implemented, for example, in the system shown in FIG. 1 or 5. The process of creating a web application can involve multiple tasks, but is designed to provide a rich set of supported features without requiring the author to become intimately involved in the technologies of web site creation. Accordingly, analytics can be provided in a similar way.

At 610, an analytics snippet is obtained from a third party analytics provider. The snippet contains generic code for embedding into a web page for page-tagging. The analytics snippet is provided (e.g., copied and pasted, uploaded, or the like) into a content creation tool.

At 620, the content creation tool generates a web application including the analytics snippet. Code is added by the tool that creates and stages the mock environment and stores the analytics snippet. This code is transparent to the user and can be added to any web application generated by the tool if the user desires to track analytics of pages hosted by the web application.

The web application can then be published to a server. Publishing enables client systems to access the web application and download it from the server.

Publishing can include copying, transmitting, moving, or otherwise putting the web application code on a server system. The content creation tool can interact directly with the server to transfer the code. Alternatively the content creation tool can be part of the server system and publishing simply equates to allowing access to code from users.

Access to the web application may be restricted and require authorization, for example by requiring a password or specific IP address.

Example 19—Example Further Features

For security purposes, precautions can be taken when handling an analytics snippet. For example, the snippet can be prevented from being executed in a higher execution scope (e.g., portal window execution scope).

The snippet can be persisted by encoding it (e.g., in basen, base 64, or the like) and storing it. A plaintext version of the snippet can be avoided within the web application.

The execution of the encoded snippet can be limited to only being within a sandbox.

Example 20—Example Link-Back System

Figure 7:
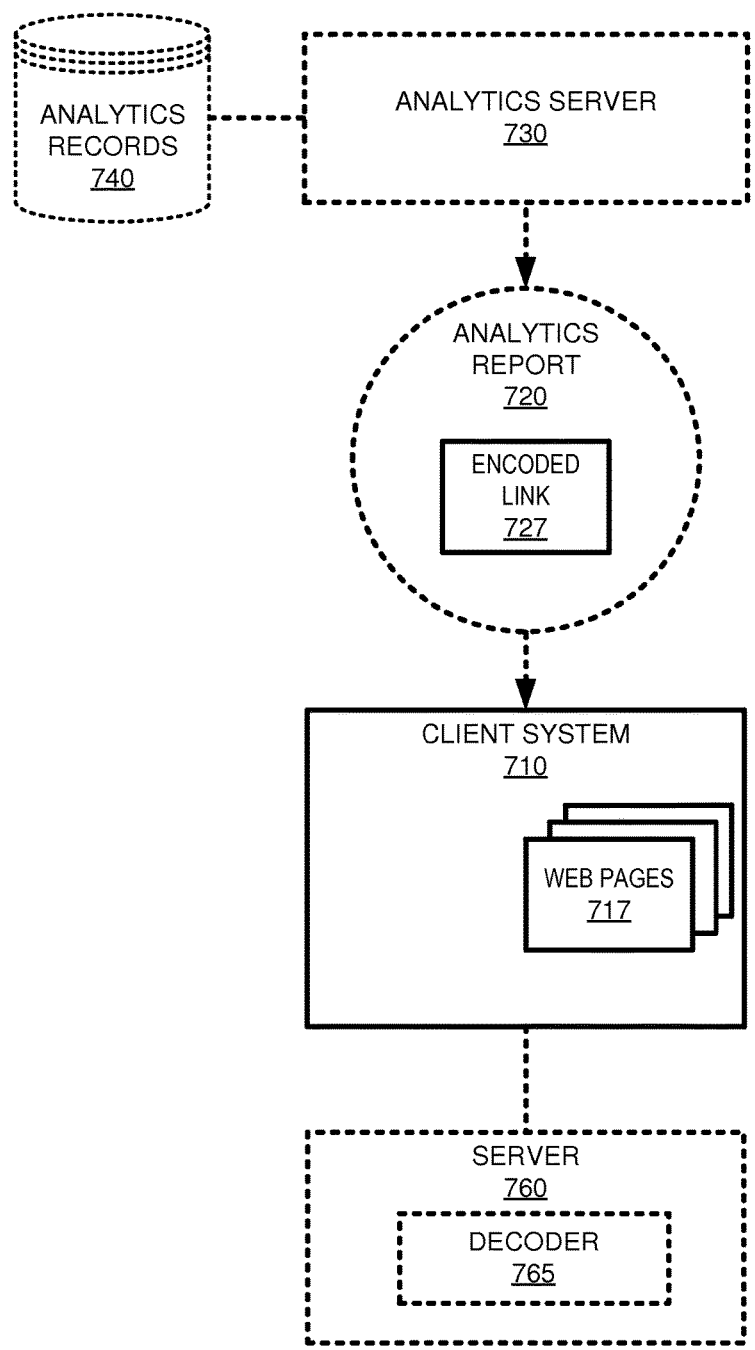
FIG. 7 is a block diagram of an example system implementing link-back to a locally-hosted web page from an analytics report.

FIG. 7 is a block diagram of an example system 700 implementing linking back to a locally-hosted web page from an analytics report 720. The system comprises a client system 710, including one or more locally-hosted web pages 717, in communication with analytics server 730, having access to analytics records 740, and further in communication with server 760.

The analytics server 730 is configured to respond to requests for analytics reports compiled from data contained in analytics records 740, and can provide an analytics report 720 in which an encoded link 727 is included. The link can be embedded in a simulated web page address that points to a real location at the server 760. The encoded link is included in the simulated web page address because the encoded link was placed in the mock environment as described herein. For example, a referring page URI can be placed in the mock environment. The referring URI can be an encoded link pointing to a location within the web application where the page resides. Thus, an analytics report can contain a simulated web page URI and an encoded referring web page URI. The simulated web page can identify a hierarchical structure to the viewed page and the encoded URI can provide the location of the page within the web application. Page identifiers, codes, and the like can be included to facilitate navigation to the web application page. In practice the link that is encoded can be quite cumbersome (e.g., with an abundance of parameters), thus the encoded link format can be more manageable.

The server 760 is configured to respond when the simulated web page address with the link 727 is activated (e.g., navigated to). The server 760 can decode the link 727 via the decoder 765. With the decoded link, the client system 710 can then navigate to or generate the web page indicated by the decoded link. For example, the server can simply redirect the client browser to the decoded link. Alternatively, the server can provide the encoded link along with the web application, and the web application can decode the link itself.

The technologies can be implemented without a server 760. For example, the client system 710 can intercept the encoded link and decode it.

Figure 8:
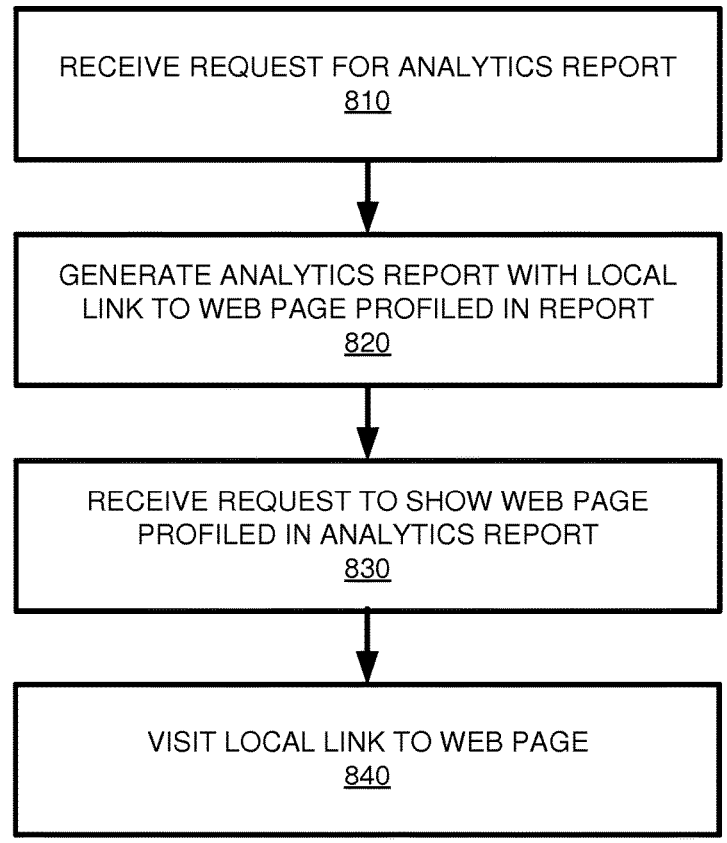
FIG. 8 is a flowchart of an example method implementing link-back to a locally-hosted web page from an analytics report.

Example 21—Example Method of Linking Back to a Locally-Hosted Web Application Page FIG. 8 is a flowchart of an example method 800 implementing link-back to a locally-hosted web page from an analytics report and can be implemented, for example, in the system shown in FIG. 1 or 7.

At 810, the client system sends a request to the analytics server to generate a report containing analytics summaries of the pages in a web application. Requesting an analytics report may include navigating to a third party analytics web site and logging in to a specific user account. Several options may be presented and selectable to determine what information will be included in the report. A supported feature can include displaying links to pages shown in analytics reports.

At 820, the analytics server accesses analytics records associated with the web application, including a URI that includes an encoded link to at least one web page locally-hosted in the web application (e.g., an encoded web page address of a locally-hosted web page). The URI is included in the analytics report to provide a link that a user can click on to display the web page that the statistics describe. The encoded link is part of the URI specifying the location of the web page, but the URI specifies a location on an actual server.

At 830, a server receives a request to view a web page profiled in the analytics report. The request may be received when the link provided in the analytics report is activated (e.g., at a client). The server receives the encoded link and decodes it to determine the true location of the web page in the web application. The true location is sent back to the client in response to activating the link.

At 840, the client system receives the true location and presents the page of the web application.

In practice, other arrangements are possible.

Example 22—Example Link-Back Encoding

Encoding for the link-back feature described herein can be achieved in a number of ways. For example, the locally-hosted web page address can be ended via a basen encoding (e.g., base64), but any other suitable encoding is possible. Encoded can use a look-up table, algorithm, or other suitable means to encode (and decode) the web page address.

Instead of using the full link, a small hash can be used (e.g., the encoding encodes it as a hash). The hash can then be used to look up the link.

Example 23—Example Implementation Via IFrame

In any of the examples herein, a mock environment can be staged within an IFrame. An IFrame may be created as a new element in the document object model when the web application is executed and remain hidden from the user.

The IFrame can be configured to listen for page navigations in the web application. It can be refreshed with each navigation. In response to a navigation request, the web application can modify the properties of the IFrame.

A mock page containing the analytics snippet may be placed in the IFrame. After the properties are set, the IFrame can be refreshed to cause a navigation to the mock page. The analytics snippet can then be executed in response to interpreting the mock page.

Example 24—Example Categories of Locally-Hosted Web Pages

Figure 9:
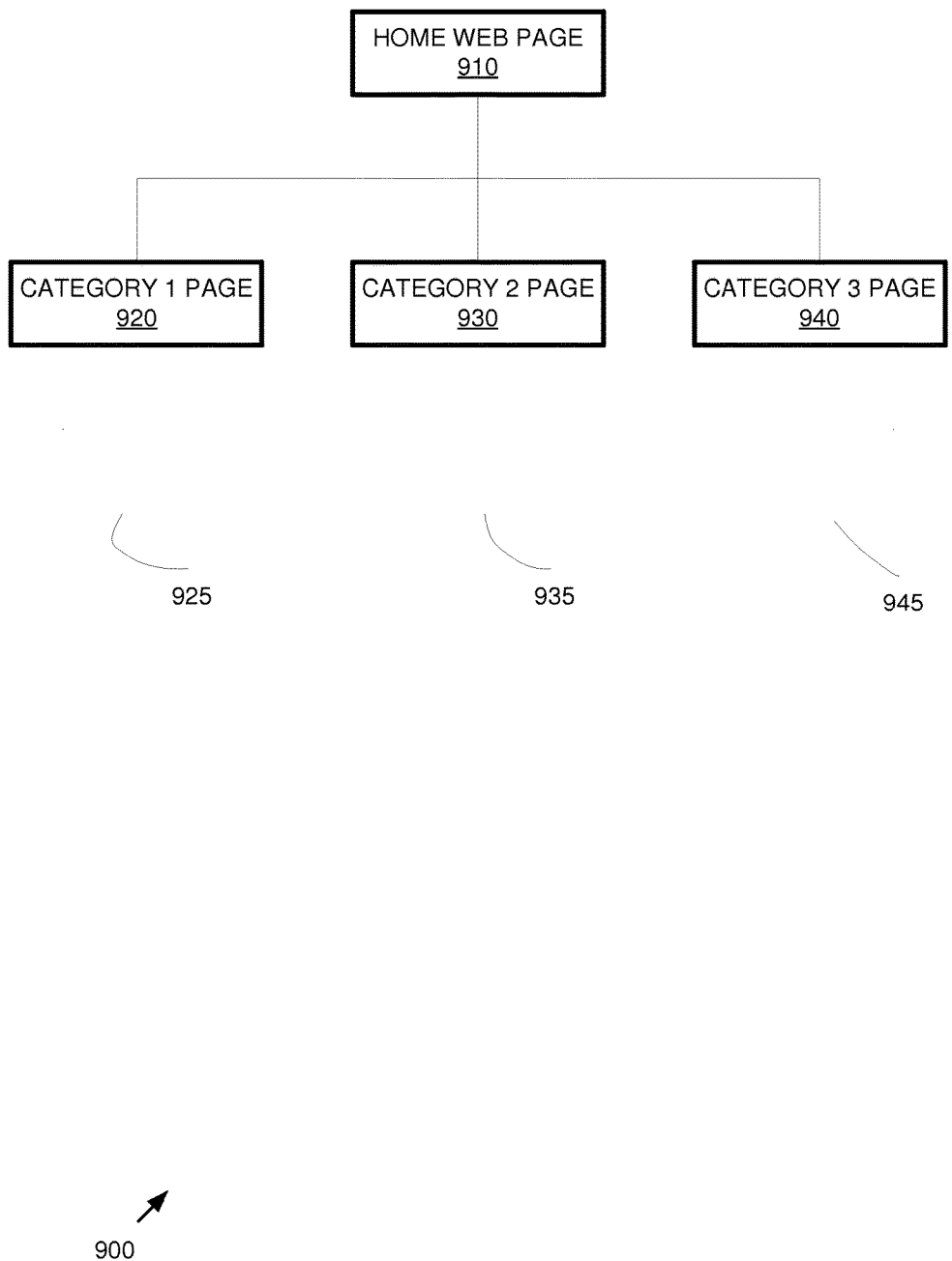
FIG. 9 is a diagram of an example hierarchy structure of web pages in a web application.

FIG. 9 shows an example categorization 900 of locally-hosted web pages within the web application. Documents, such as web pages, may be logically arranged in hierarchical categories based on where they lie within the structure of the web site or portal. In practice, web pages that are locally hosted may not be stored in such a hierarchical fashion (e.g., they are not in a directory structure of an external server) and can instead be created on demand in response to user input. Using the simulated web page addresses in a mock environment, the hierarchical structure of the pages can be mimicked such that analytics resulting from the properties sent by the analytics snippet can show a relative location of the locally-hosted page.

The URI placed in the mock environment, as described above, can be simulated and not related to the actual location of the page. When reporting a visit to the page, the web application may use the simulated web page address to create a hierarchy. For example, the first page displayed may be home web page 910, which contains three links Link one displays category 1 page 920, link two displays category 2 page 930, and link three displays category 3 page 940. The simulated web page addresses associated with the pages may be home/cat1, home/cat2, and home/cat3, respectively. Likewise, there may be subcategories of each category shown as 925, 935, and 945. Using the URI to categorize web pages allows the analytics report to show the web pages in a logical hierarchy. Analytics reports can also show traffic analysis based on higher levels (e.g., traffic for category 1 alone) or the like.

Such categories can be provided as an option when a content generator is used to generate a web application (e.g., the category can be specified as a property of the web page).

For example, a city web portal may have several web sites associated with it (e.g., health department, tax department, etc.). Such web sites can have further organization within them (e.g., birth certificates, licensing, prevention, etc.). Categories can thus be created to help the city determine traffic for the different portions of its web sites).

The hierarchical location of a web page need not be related to the location of its link. For example, a link on category 3 page 940, may have a URI placing it under category 1 page 920 in the logical hierarchical structure of the web application. In this way, the user can control how analytics will be reported by the analytics system according to the user's needs.

Example 25—Example Advantages

The technologies described herein can provide analytics services for web applications or other scenarios where pages are hosted locally. This way, users can leverage the power and features of web analytics solutions that are available to remote web page scenarios via analytics snippets.

Also, because traffic to an external web server can be reduced (e.g., only stubs are returned) or avoided entirely, network bandwidth and computing resources can be conserved.

Example 26—Example Computing Systems

Figure 10:
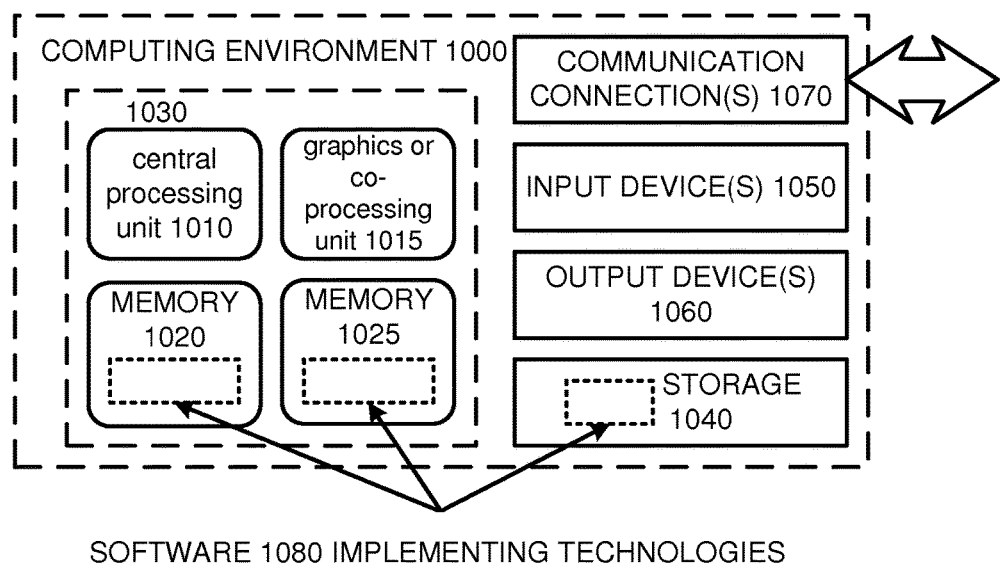
FIG. 10 is a diagram of an example computing system in which described embodiments can be implemented.

FIG. 10 illustrates a generalized example of a suitable computing system 1000 in which several of the described innovations may be implemented. The computing system 1000 is not intended to suggest any limitation as to scope of use or functionality, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. For video encoding, the input device(s) 1050 may be a camera, video card, TV tuner card, or similar device that accepts video input in analog or digital form, or a CD-ROM or CD-RW that reads video samples into the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 27—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. I therefore claim as my invention all that comes within the scope and spirit of the claims.

What is claimed is:

1. A method implemented at least in part by a computer, the method comprising:
   receiving an indication of navigation to a locally-hosted web page at a client system, wherein the locally-hosted web page has one or more webpage properties;
   staging a mock environment in the client system, wherein the mock environment comprises a set of properties that mimic visitation to the locally-hosted web page, wherein one or more properties of the set of properties are altered to be different from the webpage properties of the locally-hosted web page;
   embedding an analytics snippet into the mock environment instead of the locally-hosted web page, wherein the analytics snippet is isolated within the mock environment; and
   executing the analytics snippet embedded in the mock environment, wherein executing causes the analytics snippet to report, to an analytics server, analytics of a visitation to the locally-hosted web page based on the properties of the mock environment instead of the webpage properties of the locally-hosted web page, and wherein the analytics snippet reporting includes the altered properties under the mock environment.

2. The method of claim 1, wherein:
   staging the mock environment comprises setting one or more properties of the mock environment to reflect one or more properties for the locally-hosted web page.

3. The method of claim 2, wherein:
   the one or more altered properties for the locally-hosted web page in the mock environment comprise a simulated web page address for the locally-hosted web page; and
   executing the analytics snippet reports visitation to the simulated web page address for the locally-hosted web page.

4. The method of claim 3, wherein:
   the simulated web page address for the web page indicates an external server even though the locally-hosted web page is provided by a local web application.

5. The method of claim 2, wherein:
   the one or more properties of the locally-hosted web page comprise an encoded local web page address of the locally-hosted web page.

6. The method of claim 2, wherein:
receiving the indication comprises receiving an event indicating one or more of the properties for the locally-hosted web page.

7. The method of claim 1, wherein:
the mock environment is implemented within a document object model.

8. The method of claim 1, wherein:
the mock environment resides within an IFrame.

9. The method of claim 1, wherein:
the analytics snippet is placed in an execution context where information from the mock environment is available for extraction by the analytics snippet.

10. The method of claim 1, wherein:
the analytics snippet relays an encoded local link to the locally-hosted web page to an analytics server.

11. The method of claim 1, wherein:
the mock environment is staged within a sandbox that shares context with a web application presenting the web page; and
executing the analytics snippet comprises injecting the analytics snippet into the sandbox.

12. A system comprising:
one or more non-transitory computer-readable media comprising an analytics snippet operable to report web page visitation analytics to an analytics server;
a mock environment into which the analytics snippet is embedded and from which the analytics snippet is operable to extract one or more properties, wherein the one or more properties in the mock environment simulate a locally-hosted web page as remotely-hosted;
a web page navigation listener, wherein the web page navigation listener is configured to receive an indication of navigation to the locally-hosted web page, coupled to the mock environment and configured to alter the properties of the mock environment to reflect visitation to the locally-hosted web page and to simulate the locally-hosted web page as remotely-hosted, and further configured to execute the analytics snippet in the mock environment after altering the mock environment, wherein the locally-hosted web page is simulated by the properties of the mock environment to be a remotely-hosted web page and the analytics snippet reports visitation analytics based on the one or more properties of the mock environment; and,
the locally-hosted web page into which the mock environment is embedded.

13. The system of claim 12 wherein:
the mock environment is implemented as a sandboxed IFrame within a document object model for the web page.

14. The system of claim 12 wherein:
the analytics snippet is configured to report properties extracted from its execution environment to an analytics server.

15. One or more non-transitory computer-readable media comprising computer-executable instructions that when executed cause a computing system to perform a method comprising:
receiving an indication of navigation to a locally-hosted web page, wherein the locally-hosted web page is part of a web portal comprising a web application;
responsive to receiving the indication of navigation, staging a mock environment within the web application to reflect visitation to the locally-hosted web page and to simulate the locally-hosted web page as remotely-hosted, wherein staging the mock environment comprises setting a property of the mock environment to indicate a simulated web page address for the locally-hosted web page and encoding a local link to the locally-hosted web page into an encoded local link;
providing the locally-hosted web page to a user; and
executing an analytics snippet in the mock environment, wherein the analytics snippet is placed in an execution context where information from the mock environment is available for extraction by the analytics snippet and executing the analytics snippet reports to an analytics server visitation to the locally-hosted web page based on the staged mock environment simulating the locally-hosted web page as a remotely-hosted web page via the simulated web page address, and provides the encoded local link for the locally-hosted web page to the analytics server for retrieval in a subsequent analytics report involving the locally-hosted web page, thereby facilitating remote analytics for the locally-hosted web page within the web portal by allowing the analytics snippet to execute as if it were contained in a web page from a remote web server.

16. The method of claim 1, wherein:
the locally-hosted web page is dynamically generated.

17. The system of claim 12, wherein:
the locally-hosted web page is dynamically generated.

18. The one or more non-transitory computer-readable media of claim 15, wherein:
the locally-hosted web page is dynamically generated.

19. The one or more non-transitory computer-readable media of claim 15, wherein:
the web portal comprises an enterprise portal comprising one or more dynamically-generated web pages associated with the enterprise portal.

20. The one or more non-transitory computer-readable media of claim 15, wherein:
the indication of navigation to a locally-hosted web page comprises a calculation requiring navigation to the locally-hosted web page without a new web address.

* * * * *